Jan. 5, 1965

C. E. QUINN 3,163,958

FISH LURE AND BAIT HOLDER

Filed Nov. 21, 1963

INVENTOR.
CLAYTON ERVIN QUINN

BY B. P. Fishburn Jr.

ATTORNEY 3,163,958
FISH LURE AND BAIT HOLDER
Clayton Ervin Quinn, Rte. 1, Roebuck, S.C.
Filed Nov. 21, 1963, Ser. No. 325,383
3 Claims. (Cl. 43—42.06)

This invention relates to fish lures and baits.

The objects of the invention is to provide a combination bait holder and lure which has been discovered to be highly effective for catching a variety of different species of fish, the device being highly simplified in construction, very lightweight and economical to manufacture.

Another object is to provide a bait holder and lure in the nature of a small disc formed of plastic or other lightweight material having opening means to engage the fish hook and requiring no additional means for attachment to the fishing line.

Another object is to provide a lure and bait holder which is colored to attract fish and which has novel means for anchoring bait material to the body of the lure or bait holder.

Still another object is to provide a disc element of the mentioned type which may be employed for catching fish with or without the use of liquid or solid bait substances.

Other objects and advantages of the invention will be apparent during the course of the following description.

Figure 1:
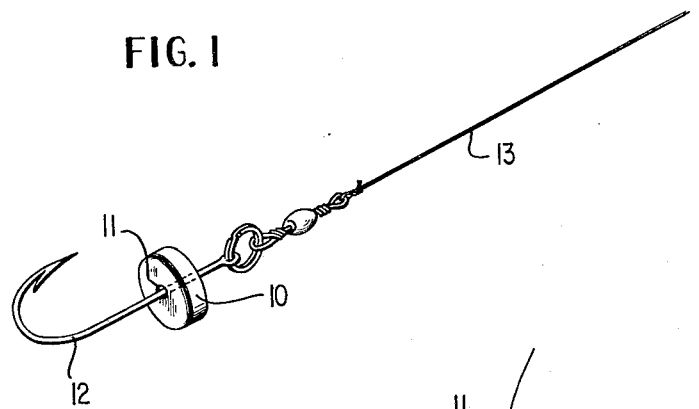
Figure 2:
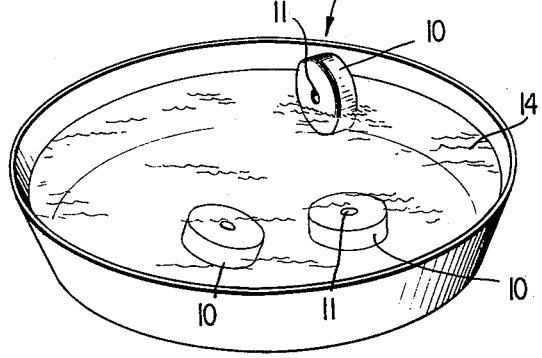
Figure 5:
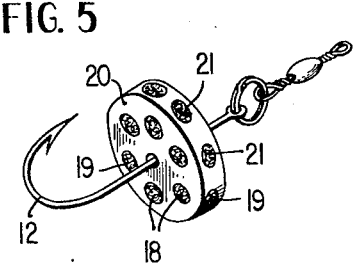
Figure 3:
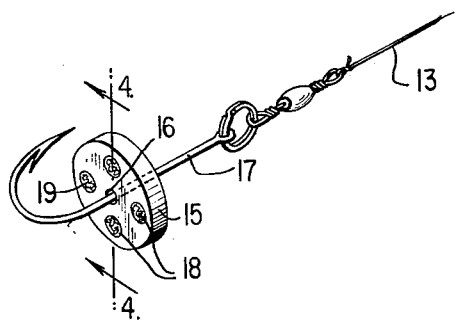
Figure 4:
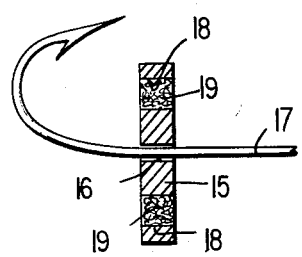

In the accompanying drawings forming a part of this application and in which like numerals are employed to designate like parts throughout the same, FIGURE 1 is a perspective view of a disc type lure embodying the invention and illustrating the mounting of the same upon a fish hook, FIGURE 2 is a perspective view illustrating how the lure may be dipped in oil or liquid bait prior to use, FIGURE 3 is a perspective view of a lure and bait holder according to a modification of the invention, FIGURE 4 is an enlarged vertical section taken on line 4—4 of FIGURE 3, and FIGURE 5 is another perspective view similar to FIGURE 3 showing another modification of the invention.

In the drawings, wherein for the purpose of illustration are shown preferred embodiments of the invention, attention is directed first to FIGURES 1 and 2 showing a preferred embodiment, wherein the number 10 designates a preferably cylindrical button or disc formed of plastic or some other suitable lightweight material including materials which may be porous or non-porous, as desired. The disc 10 in the simplest form shown has a single central axis opening 11 of sufficient size to allow the disc to be engaged over a fish hook 12 and remain thereon during use. The fish hook is attached to a line 13 by any conventional means. The disc 10 is preferably loosely mounted upon the shank of the fish hook so as to be freely movable thereon. It has been discovered that if the disc 10 is colored yellow, it tends to attract the fish more readily. Other colors may be employed within the scope of the invention. Additionally, the disc 10 may be formed in quite a range of sizes, somewhat dependent upon the size of the hook being used and the type of fish being sought. The general proportions of the disc 10 relative to the hook are shown plainly in FIGURE 1.

It has been found that the disc 10 of plastic or the like is very effective for catching fish without the addition of any bait, natural or artificial. However, if preferred, as illustrated in FIGURE 2, each disc 10 prior to placement on the hook 12 may be dipped in a suitable bait oil 14 or like liquid material of a conventional nature known to attract fish.

In any event, the disc 10 is lightweight because it is known that fish tend to suck objects into their mouths and a lightweight object is more effective than a heavy object.

In FIGURES 3 and 4, there is shown a modification of the invention wherein a cylindrical disc 15 formed of the aforementioned material has a preferably central opening 16 formed therethrough for engagement over the hook 17. A plurality of additional openings 18 are formed through the disc 15 in surrounding relation to the central opening 16 and radially outwardly therefrom. Suitable bait 19 of a preferably pasty consistency is pressed manually into the several openings 18 prior to use of the disc 15 in the manner shown in FIGURE 3. The bait 19 may be ordinary bread dough flavored with oil or the like or it may be a pasty composition containing meat or fish or it may be ground meat or the like. Any solid bait substance may be introduced into the openings 18 and pressed therein with the fingers. The embodiment shown in FIGURES 3 and 4 is highly effective for catching certain fish and, as previously stated, the disc may be employed with or without the addition of bait thereto in either of the manners shown in FIGURES 2 and 4. The disc 15 is preferably colored yellow although not necessarily so.

FIGURE 5 shows another modification which is essentially the same as the modification of FIGURES 3 and 4 but differs therefrom in that the modified disc 20 has additional radial openings 21 formed in its periphery for the reception of the bait 19. The openings 21 may pass entirely through the disc 20 diametrically and may intersect the openings 18 thereof. In FIGURE 5, the bait 19 is pressed into the openings 18 and 21 prior to use of the disc upon the fish hook.

The device of the invention is very effective for surf fishing, trolling and in other forms of fishing. It is characterized by extreme simplicity, minimum weight and economy of manufacture. It is very easy to use alone or in combination with bait and reduces to a minimum the number of mechanical attachments and metal parts on the fishing line. The invention provides a combined lure and bait carrier in a simple disc or button-like structure.

It is to be understood that the forms of the invention, herewith shown and described, are to be taken as preferred examples of the same, and that various changes in the shape, size and arrangement of parts may be resorted to, without departing from the spirit of the invention or scope of the subjoined claims.

Having thus described my invention, I claim:

1. A fish lure comprising a unitary substantially circular disc body portion formed of substantially rigid material, said disc body portion having a central axial through opening of sufficient size to pass over the barb of a fish hook and to be loosely held upon the shank of said hook, said body portion brightly colored, and the outside diameter of the body portion being somewhat smaller than the diameter of a circle centered on the fish hook shank and circumscribed at said barb.

2. A fish lure comprising a relatively thin circular disc body portion formed of material which is substantially rigid and having a small central through opening to loosely receive the shank of a fish hook, the external diameter of the body portion being smaller than the diameter of a circle centered on the hook shank and circumscribed through the hook barb, said disc body portion provided radially outwardly of said central opening with a plurality of additional openings adapted to have bait material pressed therein to attract fish.

3. The invention as defined by claim 2, and wherein the substantially rigid body portion is formed of plastic.

References Cited by the Examiner
UNITED STATES PATENTS

| | | |
|---|---|---|
| 2,703,945 | 3/55 | Johnson. |
| 2,771,704 | 11/56 | Biggs _____ 43—43.2 X |
| 3,108,389 | 10/63 | McGuire _____ 43—42.06 |

ABRAHAM G. STONE, *Primary Examiner.*